US010242667B2

(12) United States Patent
Sharma et al.

(10) Patent No.: US 10,242,667 B2
(45) Date of Patent: Mar. 26, 2019

(54) NATURAL LANGUAGE GENERATION IN A SPOKEN DIALOGUE SYSTEM

(71) Applicant: Maluuba Inc., Toronto (CA)

(72) Inventors: Shikhar Sharma, Montreal (CA); Jing He, Toronto (CA); Kaheer Suleman, Cambridge (CA); Philip Bachman, Montreal (CA); Hannes Schulz, Karlsruhe (DE)

(73) Assignee: Maluuba Inc., Toronto, Ontario (CA)

( * ) Notice: Subject to any disclaimer, the term of this patent is extended or adjusted under 35 U.S.C. 154(b) by 0 days.

(21) Appl. No.: 15/612,687

(22) Filed: Jun. 2, 2017

(65) Prior Publication Data

US 2017/0352347 A1 Dec. 7, 2017

Related U.S. Application Data

(60) Provisional application No. 62/345,456, filed on Jun. 3, 2016.

(51) Int. Cl.
| | |
|---|---|
| *G10L 15/16* | (2006.01) |
| *G10L 15/18* | (2013.01) |
| *G06F 17/27* | (2006.01) |
| *G06F 17/28* | (2006.01) |
| *G10L 15/22* | (2006.01) |
| *G06N 3/04* | (2006.01) |

(52) U.S. Cl.
CPC ........ *G10L 15/1815* (2013.01); *G06F 17/277* (2013.01); *G06F 17/279* (2013.01); *G06F 17/2881* (2013.01); *G06N 3/0445* (2013.01); *G06N 3/0454* (2013.01); *G10L 15/16* (2013.01); *G10L 15/22* (2013.01)

(58) Field of Classification Search
CPC ............... G06F 17/2765; G06F 17/277; G06F 17/2785; G06F 17/279; G10L 15/22; G10L 15/16; G10L 15/18; G06N 3/04
USPC ......... 704/270, 275, 9, 232, 257; 706/27, 55
See application file for complete search history.

(56) References Cited

U.S. PATENT DOCUMENTS

| | | | | |
|---|---|---|---|---|
| 9,607,616 | B2* | 3/2017 | Watanabe | G10L 15/1822 |
| 10,049,106 | B2* | 8/2018 | Goyal | G06F 17/2881 |
| 2003/0156689 | A1* | 8/2003 | Ando | H04M 1/271 |
| | | | | 379/88.01 |
| 2008/0319752 | A1* | 12/2008 | Kuo | G10L 13/047 |
| | | | | 704/258 |

(Continued)

OTHER PUBLICATIONS

Matthew Henderson, "Machine Learning for Dialog State Tracking: A Review", Proceedings of the First International Workshop on Machine Learning in Spoken Language Processing (2015), 8 Pages. (Year: 2015).*

(Continued)

*Primary Examiner* — Martin Lerner

(57) ABSTRACT

Described herein are systems and methods for providing a natural language generator in a spoken dialog system that considers both lexicalized and delexicalized dialog act slot-value pairs when translating one or more dialog act slot-value pairs into a natural language output. Each slot and value associated with the slot in a dialog act are represented as (dialog act+slot, value), where the first term (dialog act+slot) is delexicalized and the second term (value) is lexicalized. Each dialog act slot-value representation is processed to produce at least one delexicalized sentence as an output. A lexicalized sentence is produced by replacing each delexicalized slot with the value associated with the delexicalized slot.

20 Claims, 8 Drawing Sheets

(56) References Cited

U.S. PATENT DOCUMENTS

| | | | | |
|---|---|---|---|---|
| 2012/0253792 | A1* | 10/2012 | Bespalov | G06F 17/30707 704/9 |
| 2015/0127594 | A1* | 5/2015 | Parada San Martin | G10L 15/16 706/16 |
| 2015/0340033 | A1* | 11/2015 | Di Fabbrizio | G10L 15/18 704/254 |
| 2016/0104481 | A1* | 4/2016 | Ehsani | G10L 15/193 704/9 |
| 2016/0322050 | A1* | 11/2016 | Wang | G10L 15/22 |
| 2017/0091171 | A1* | 3/2017 | Perez | G10L 15/22 |
| 2017/0140755 | A1* | 5/2017 | Andreas | G06F 17/241 |
| 2017/0177715 | A1* | 6/2017 | Chang | G06F 17/2785 |
| 2017/0270409 | A1* | 9/2017 | Trischler | G06F 17/2785 |
| 2017/0287478 | A1* | 10/2017 | Schulz | G10L 15/16 |
| 2018/0121415 | A1* | 5/2018 | Perez | G06F 17/279 |
| 2018/0137854 | A1* | 5/2018 | Perez | G10L 15/063 |

OTHER PUBLICATIONS

DeHouck et al., "Delexicalized Word Embeddings for Cross-lingual Dependency Parsing", Proceedings of the 15th Conference of the European Chapter of the Association for Computational Linguistics: vol. 1, Long Papers, Apr. 3-7, 2017, pp. 241 to 250. (Year: 2017).*

Nayak et al., "To Plan or not to Plan? Discourse planning in slot-value informed sequence to sequence models for language generation", Interspeech 2017, 5 Pages. (Year: 2017).*

"International Search Report and Written Opinion Issued in PCT Application No. PCT/US2017/035767", dated Sep. 1, 2017, 13 Pages.

Sharma, et al., "Natural Language Generation in Dialogue using Lexicalized and Delexicalized Data", In the International Conference on Learning Representations (ICLR) Workshop, Jun. 11, 2016, 10 Pages.

Wen, et al., "Multi-domain Neural Network Language Generation for Spoken Dialogue Systems", Paper submitted in arXiv Repository, Cornell University Library, Mar. 3, 2016, pp. 120-129.

Wen, et al., "Semantically Conditioned LSTM-based Natural Language Generation for Spoken Dialogue Systems", In the Conference on Empirical Methods in Natural Language Processing, Sep. 17, 2015, pp. 1711-1721.

* cited by examiner

NATURAL LANGUAGE GENERATION IN A SPOKEN DIALOGUE SYSTEM

CROSS-REFERENCE TO RELATED APPLICATION(S)

This application claims priority to U.S. Provisional Application No. 62/345,456 entitled "Natural Language Generation For Spoken Dialogue Systems Using Lexicalized and Delexicalized Dialogue-Acts and Transfer Learning," filed on Jun. 3, 2016, of which the entire disclosure is hereby incorporated by reference in its entirety.

BACKGROUND

Natural language generation ("NLG") by machines, at a near-human level, is a major goal for Artificial Intelligence. A goal of NLG is to convert computer-based data or representations into human-understandable speech or expression. There are various considerations when trying to make computer generated text sound more "natural" such as what type of text is sought to be generated (communicative goal), what entities, events and relationships will express the content of that text, and how to forge grammatical constructions with the content into "natural" sounding text.

Some spoken dialogue systems rely on template-based, hand-crafted rules for the NLG. However, in some instances, the required templates are cumbersome to maintain. Additionally, the overall approach of the template-based, hand-crafted rules does not scale well to complex domains and databases.

SUMMARY

Embodiments disclosed herein provide a natural language generator in a spoken dialogue system that considers both lexicalized and delexicalized dialogue act slot-value pairs when translating one or more dialogue act slot-value pairs into a natural language output. Each slot and value associated with the slot in a dialogue act are represented as (dialogue act+slot, value), where the first term (dialogue act+slot) is delexicalized and the second term (value) is lexicalized. Each dialogue act slot-value representation is processed to produce at least one delexicalized sentence that represents the natural language output. A lexicalized sentence is produced from the delexicalized sentence(s) by replacing each delexicalized slot with the value associated with that delexicalized slot.

In one aspect, a spoken dialogue system includes first processing circuitry and second processing circuitry operably connected to the first processing circuitry. One or more storage devices store computer executable instructions that when executed by the first and the second processing circuitries, performs a method. The method includes processing, by the first processing circuitry, one or more dialogue act slot-value representations to produce a first representation of the one or more dialogue act slot-value representations, and processing, by the second processing circuitry, the first representation and a second representation to produce one or more delexicalized sentences as an output. Each dialogue act slot-value representation includes a delexicalized dialogue act and slot and a lexicalized value associated with the delexicalized slot. The second representation represents one or more delexicalized slots that are expected to be included in the natural language output.

In another aspect, a method of operating a spoken dialogue system includes receiving one or more dialogue act slot-value representations, processing the one or more dialogue act slot-value representations to produce a first representation of the one or more dialogue act slot-value representations, and processing the first representation and a second representation to produce one or more delexicalized sentences as an output. Each dialogue act slot-value representation includes a delexicalized dialogue act and slot and a lexicalized value associated with the delexicalized slot. The second representation represents one or more delexicalized slots expected to be included in the natural language output.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
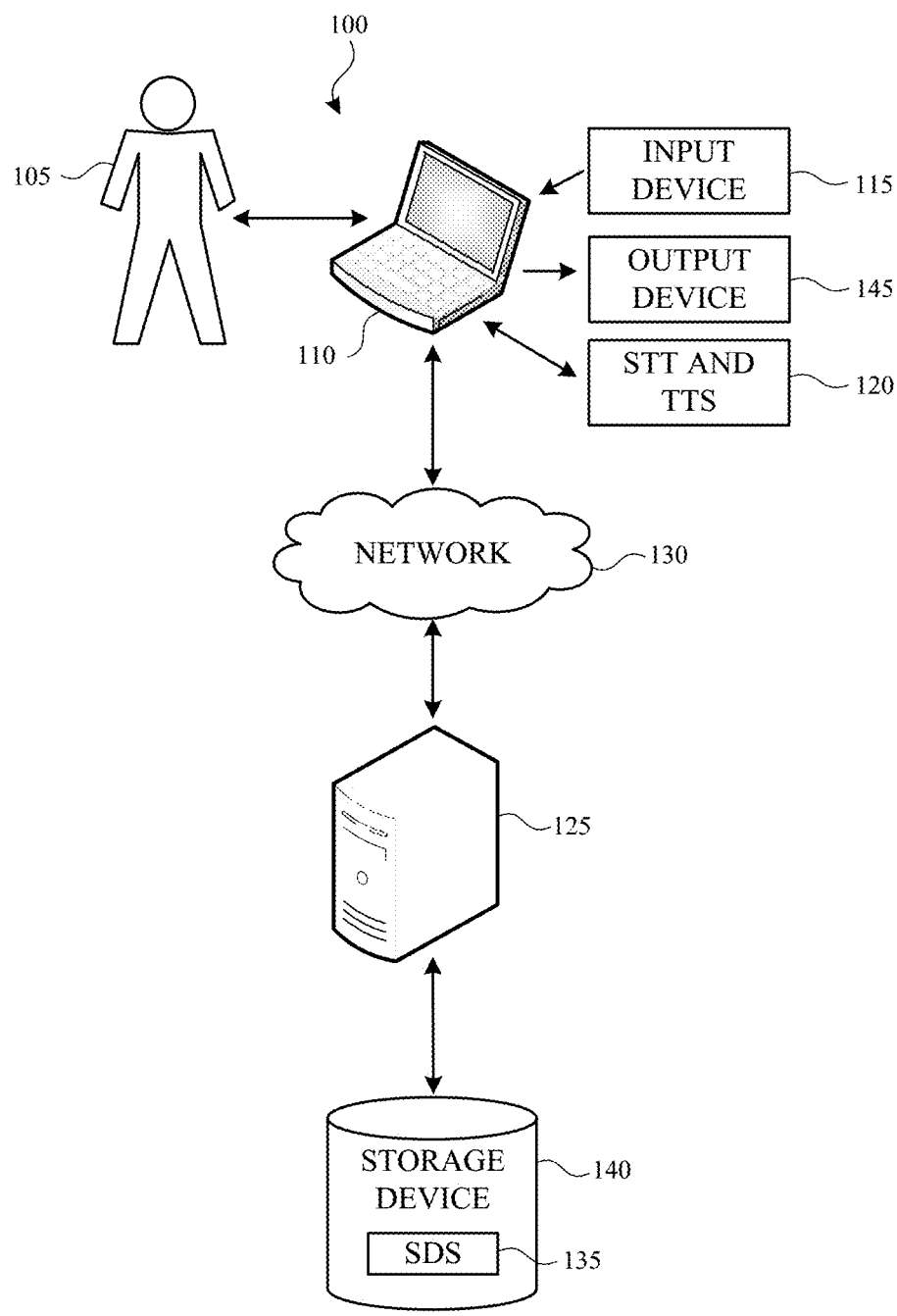
FIG. 1 illustrates an example system that can include a spoken dialogue system.

FIG. 1 illustrates an example system that can include a spoken dialogue system. The system 100 generates and controls a machine response to a language input. The system 100 allows a user 105 to submit the language input through a client-computing device 110. The client-computing device 110 may include, or be connected to, an input device 115 that receives the language input. The language input can be submitted as a textual input (e.g., written) or as a spoken (verbal) input that is converted to text (e.g., using a speech-to-text (STT) apparatus 120). The input device 115 may be any suitable type of input device or devices configured to receive the language input. In non-limiting examples, the input device 115 may be a keyboard (actual or virtual) and/or a microphone.

The client-computing device 110 is configured to access one or more server-computing devices (represented by server-computing device 125) through one or more networks (represented by network 130) to interact with a spoken dialogue system (SDS) 135 stored on one or more storage devices (represented by storage device 140) and executed by the server-computing device 125. As will be described in more detail later, the SDS 135 receives the language input and causes one or more machine actions to be performed in response to the language input. The machine response that is based on the machine action(s) can be provided to the user 105 through one or more output devices (represented by output device 145) that is in, or connected to, the client-computing device 110. In non-limiting examples, the output device 145 is a display that displays the machine response and/or a speaker that "speaks" the machine response (e.g., using a text-to-speech (TTS) apparatus 120).

In one or more embodiments, the client-computing device 110 is a personal or handheld computing device having both the input and the output devices 115, 145. For example, the client-computing device 110 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device that provides and/or interacts with an SDS may be utilized.

As should be appreciated, FIG. 1 is described for purposes of illustrating the present methods and systems and is not intended to limit the disclosure to a particular sequence of steps or a particular combination of hardware or software components.

A dialogue between a machine and a user relies on turn-taking behavior. For example, a user can ask the machine to locate an Italian restaurant in downtown, which is a first turn in the dialogue. In response to the request, the machine may state it was unable to find an Italian restaurant in downtown, which is a machine response and a second turn in the dialogue. In task-oriented spoken dialogues, a user has a goal (or task) he or she wants to achieve in the dialogue. For example, a user may want to obtain the name of a restaurant. A spoken dialogue system obtains information about the user's goal based on the user turns in the dialogue. As the dialogue progresses, the spoken dialogue system is able to obtain the information needed to complete the user's goal.

A spoken dialogue system typically operates in a domain. The domain is related to the user's goal. For example, in the weather domain, a user may obtain information on the weather (e.g., temperature). Similarly, in the restaurant domain, a user can obtain the address of a restaurant that serves a particular type of food.

Each domain has slot types ("slots") that are associated with the domain. A slot is a variable, and a slot value ("value") is a value that fills the slot. For example, in the restaurant domain, a food type may be a slot and a type of food (e.g., "Italian") can be a value for that slot. Over the turns in the dialogue, the spoken dialogue system obtains information about the user's goal and the information needed to complete the user's goal.

Figure 2:
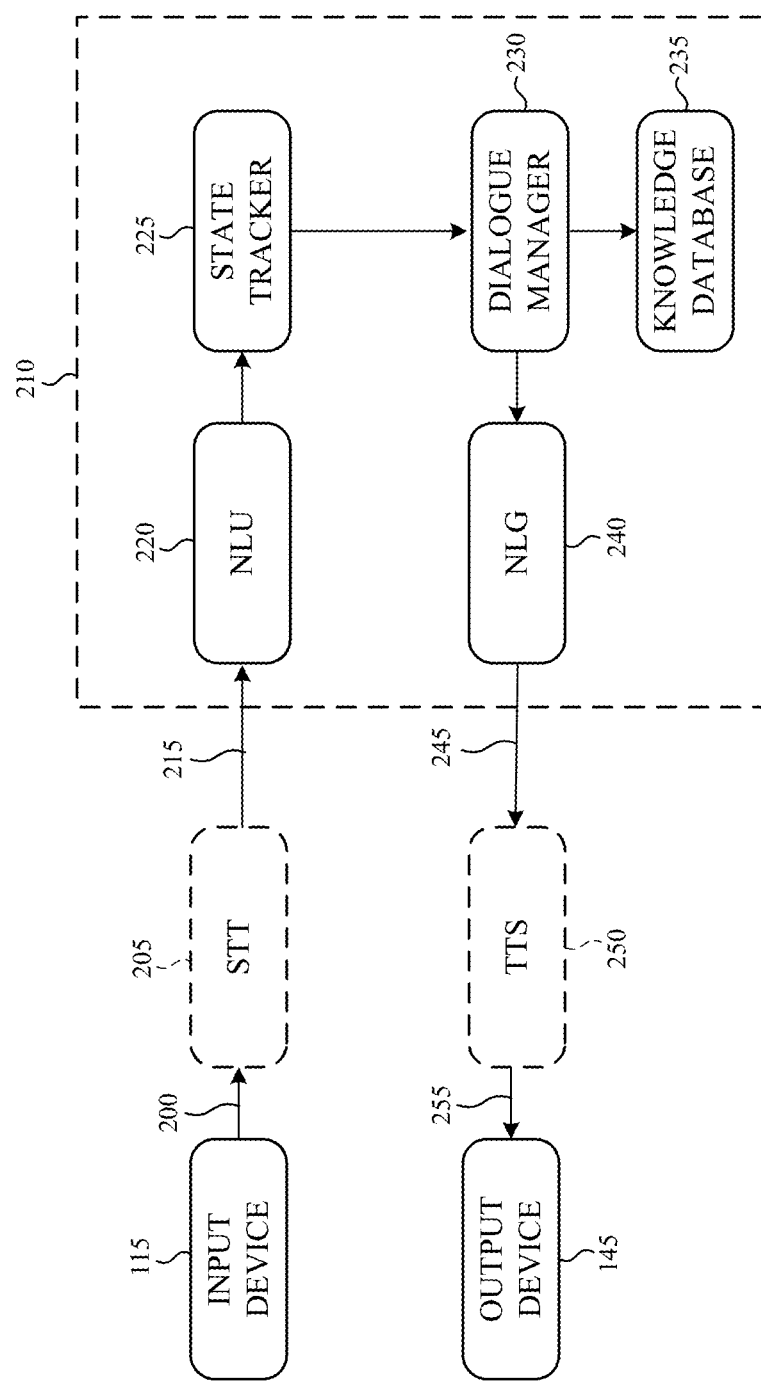
FIG. 2 is a block diagram depicting an example system that includes a spoken dialogue system.

A general and brief description of the components, operations, and/or functions of an SDS will now be described. FIG. 2 is a block diagram depicting an example system that includes an SDS. An input device 115 receives a language input from a user. The input device 115 produces an output 200 that represents the language input. In some embodiments, when the language input is a verbal input, the output 200 is received by the STT apparatus 205 that converts the verbal or audio input into one or more words (e.g., a sequence of words). One example of an STT apparatus 205 is an automatic speech recognition apparatus.

An SDS 210 receives the output 200 from the input device 115 or the representation 215 of the language input from the STT apparatus 205. The SDS 210 includes a natural language understanding (NLU) apparatus 220, a state tracker 225, a dialogue manager 230, a knowledge database 235, and a natural language generator (NLG) 240. The operations of the SDS 210 are performed by one or more computing devices, such as, for example, one or more server computing devices. The one or more computing devices each include at least one memory that stores computer or processing unit executable instructions that, when executed by at least one processing unit in the computing device(s), perform the operations of the SDS 210.

In one embodiment, the NLU apparatus 220 converts the output 200 or the representation 215 of the output into an internal representation that is used to determine the user's goal based on the language input. The NLU apparatus 220 may also determine one or more slots and/or values for a given domain. For example, in the restaurant domain, a slot may be a food type and a value can be a type of food (e.g., Chinese or pizza). Additionally or alternatively, a slot may be a location and a value can be "downtown", "in the city", or "Montreal."

In some implementations, the state tracker 225 tracks what has happened in the dialogue, which is known as the state of the dialogue. The state of the dialogue includes (1) a current turn; and (2) all the turns that precede the current turn. Based on the dialogue state, the dialogue manager 230 determines a machine action to be performed (e.g., how the machine should respond to the user's turn in the dialogue).

Each sentence in the dialogue is decomposed into one or more dialogue acts. Table 1 contains an example list of dialogue acts for the restaurant domain. Other embodiments can use a different list of dialogue acts.

TABLE 1

| DIALOGUE ACT | DESCRIPTION |
| --- | --- |
| Inform | Inform the user about some slot |
| Offer | Offer a suggestion to the user |
| Request | Request a slot from the user |
| Implicit Confirmation | Confirm a slot with the user while continuing with the conversation |
| Explicit Confirmation | Confirm a slot with the user |
| Canthelp | No results found for some slot |
| Select | Ask to select one from multiple values |
| Welcome Message | Introductory welcome message |
| Repeat | Ask the user to repeat the previous sentence |
| Reqmore | Ask the user for more information |

Each of the dialogue acts can include one or more slots. As described earlier, a slot is a variable that may be filled by, or assigned, a particular value. For example, in the restaurant domain, a slot can be "pricerange" and a value for that particular slot may be "cheap."

In some embodiments, the dialogue manager 230 can access a knowledge database 235. The knowledge database 235 captures or defines information about words, word embeddings, slots, values, properties of entities that a dialogue system can talk about, and relationships between words, word embeddings, slots, values, and/or the properties of entities (e.g., files, look-up tables, databases, and the like). Non-limiting examples of a knowledge database include an ontology and/or a dictionary.

The NLG 240 receives the machine action (e.g., dialogue act, the slot(s), and the corresponding value(s)) from the dialogue manager 230 and generates the natural language output 245 for the machine response. An NLG 240 typically has to determine what should be said, how it should be said (e.g., syntax), and then produce the output text. As will be described in more detail later, the NLG 240 represents each slot and associated value in a dialogue act as (dialogue act+slot, value), where the first term (dialogue act+slot) is delexicalized and the second term (value) is lexicalized. This representation aligns each delexicalized dialogue act and slot with a corresponding lexicalized value to produce a dialogue act slot-value representation. Each dialogue act slot-value representation is processed to produce a first representation that represents all of the dialogue act slot-value representations. A second representation is provided that represents all of the delexicalized slots expected to be in the natural language output. The first and the second representations are processed to produce at least one delexicalized sentence as an output. A lexicalized sentence is then produced from the delexicalized sentence(s) by replacing each delexicalized slot with the value associated with the delexicalized slot.

As described earlier, the NLG 240 outputs the natural language output that will ultimately be provided to the user (e.g., via a client-computing device). When the natural language output 245 is to be provided to the user as a verbal output, a TTS apparatus 250 receives the natural language output 245 from the NLG 240 and synthesizes the corresponding verbal output 255. The verbal output 255 is then provided to the user using an output device 145 (e.g., via a speaker). In some instances, the natural language output 245 will be presented to the user as a written output using the output device 145 (e.g., via a display), in which case the TTS apparatus 250 does not operate on the natural language output 245.

The various components shown in FIG. 2 can be implemented in any suitable device in a system (e.g., client-computing device 110, server-computing device 125, and/or storage device 140 in FIG. 1). For example, in one embodiment, the STT apparatus 205, the SDS 210, and the TTS apparatus 250 are implemented in one or more server-computing devices (e.g., server-computing device 125). In another embodiment, the STT apparatus 205, the SDS 210, and the TTS apparatus 250 are distributed over one or more server-computing devices and one or more storage devices (e.g., storage device 140 in FIG. 1). In another non-limiting example, the STT apparatus 205 and the TTS apparatus 250 are implemented in a client-computing device (e.g., client-computing device 110 and STT and TTS apparatuses 120 in FIG. 1) and the SDS 210 is implemented in one or more server-computing devices.

Figure 3:
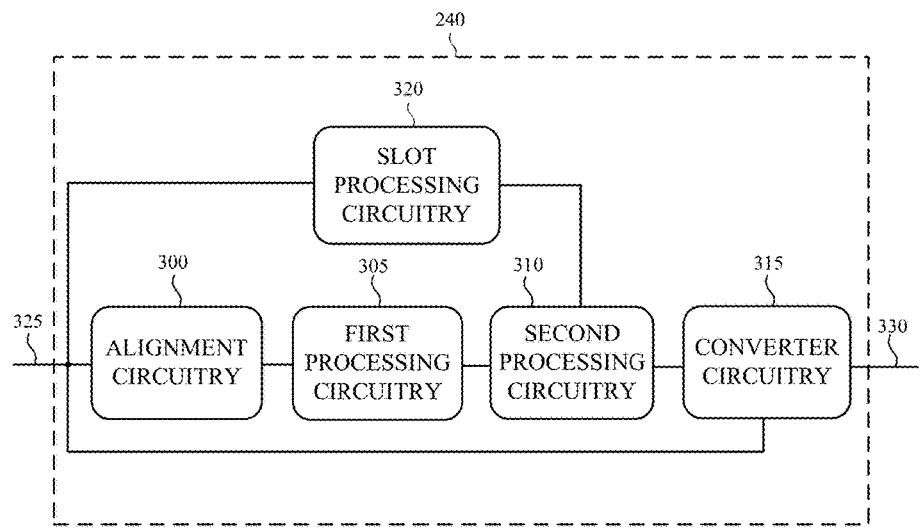
FIG. 3 is a block diagram illustrating an example natural language generator that is suitable for use in the system shown in FIG. 2.

Embodiments described herein provide an NLG apparatus that considers both lexicalized and delexicalized dialogue act slot-value pairs when translating one or more dialogue act slot-value pairs into a natural language output. FIG. 3 is a block diagram illustrating an example natural language generator that is suitable for use in the system shown in FIG. 2. The representative NLG 240 includes alignment circuitry 300, first processing circuitry 305 connected to an output of the alignment circuitry 300, and second processing circuitry 310 connected to an output of the first processing circuitry 305. Converter circuitry 315 is connected to the output of the second processing circuitry 310. Slot processing circuitry 320 is connected between an input line 325 and the second processing circuitry 310. The input line 325 is also connected to an input of the alignment circuitry 300 and to an input of the converter circuitry 315.

At each time-step t, the alignment circuitry 300, the slot processing circuitry 320, and the converter circuitry 315 receive the dialogue act, the slot(s), and the corresponding value(s) from the dialogue manager (e.g., dialogue manager 230 in FIG. 2) on the input line 325. The alignment circuitry 300 forms a dialogue act slot-value representation for each dialogue act. As described earlier, the dialogue act slot-value representation includes the delexicalized dialogue+slot along with a corresponding lexicalized value for the delexicalized slot. Each value may include one or more words. For example, the delexicalized dialogue+slot can be "Inform-Area", where "Inform" is the dialogue act and "Area" the slot. The corresponding value for the delexicalized slot "Area" may be "near the plaza." Thus, the dialogue act slot-value representation represents (Inform-Area, near the plaza). In this manner, the alignment circuitry 300 aligns the delexicalized dialogue+slot with the value associated with the delexicalized slot.

Figure 4:
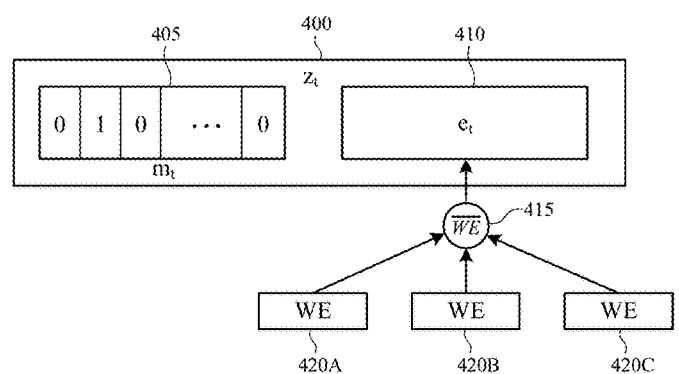
FIG. 4 depicts an example process of producing a dialogue act slot-value representation.

FIG. 4 depicts an example process of producing a dialogue act slot-value representation. A dialogue act slot-value representation is generated for each dialogue act. In one embodiment, each dialogue act slot-value representation is represented as a vector $z_t$ 400 that is formed by concatenating two vectors $m_t$ 405 and $e_t$ 410. The vector $m_t$ 405 represents the delexicalized dialogue act+slot and the vector $e_t$ 410 represents the value associated with the delexicalized slot. In one implementation, the vector $m_t$ 405 is a one-hot vector of a dialogue act and a slot. The vector $e_t$ 410 is formed by computing a mathematical value or representation (using computing circuit 415), such as a mean, of one or more word embeddings (WE) 420 (e.g., WE 420A, WE 420B, WE 420C) of all of the words corresponding to the value associated with the slot in the vector $m_t$. For example, the vector $m_t$ may represent the (dialogue act+slot) of "Inform-Area". If the value associated with the slot "Area" is "near the plaza", a mathematical representation (e.g., mean) of the word embeddings for the words in the value (e.g., "near", "the", and "plaza") is generated by computing circuit 415 and that mathematical representation (e.g., mean) is represented by the vector $e_t$.

Returning to FIG. 3, each turn of the dialogue is composed of one or more such dialogue act slot-value representations that, at each time-step t, are input to the first processing circuitry 305. At each time-step t, the first processing circuitry 305 processes the dialogue act slot-value representation(s) (e.g., all vectors $z_t$) to produce a first representation of the dialogue act slot-value representations. In one embodiment, the first processing circuitry 305 includes a neural network, such as a one-layer bi-directional long short-term memory (LSTM) recurrent neural network (RNN). The LSTM implementation can be defined by the equations:

$$i_t = \sigma(W_{zi}z_t + W_{hi}h_{t-1}) \quad \text{Equation 1}$$

$$f_t = \sigma(W_{zf}z_t + W_{hf}h_{t-1}) \quad \text{Equation 2}$$

$$o_t = \sigma(W_{zo}z_t + W_{ho}h_{t-1}) \quad \text{Equation 3}$$

$$g_t = \tan h(W_{zg}z_t + W_{hg}h_{t-1}) \quad \text{Equation 4}$$

$$c_t = f_t \odot c_{t-1} + i_t \odot g_t \quad \text{Equation 5}$$

$$h_t = o_t \odot \tan h(c_t), \quad \text{Equation 6}$$

where $i_t$ is the input gate at time-step t, $f_t$ is the forget gate at time-step t, $o_t$ is the output gate at time-step t, $c_t$ is the cell state at time-step t, $h_t$ is the hidden state at time-step t, $z_t$ is the input to the LSMT at time-step t, and $\odot$ indicates element-wise product. In this example embodiment, the first representation is produced by determining a mathematical value (e.g., mean) across all of the time-steps of the concatenated hidden states $h_t$ of the forward and backward LSTMs.

The slot processing circuitry 320 receives the dialogue act, the slot(s), and the corresponding value(s) from the dialogue manager on line 325 and produces a second representation that represents all of the slots (e.g., slot vectors $m_t$) that are expected to be present in the natural language output. In one embodiment, the second representation is a vector $d_0$ that has an initial value determined by the equation:

$$d_0 = \sum_{t=1}^{M} m_t, \quad \text{Equation 7}$$

where M represents the number of time-steps t. The initial sum $d_0$ is expressed over all of the one-hot vectors $m_t$ associated with the slots that are expected to be in the natural language output. Accordingly, in this example embodiment, $d_0$ is a binary vector over all of the slots that are expected to be present in the natural language output.

The second processing circuitry 310 receives and processes the first and the second representations to produce one or more delexicalized sentences. In one embodiment, the second processing circuitry 310 includes a neural network, such as a semantically controlled long short-term memory (sc-LSTM) recurrent neural network (RNN). The sc-LSTM implementation may be defined by Equations 1-4 and 6 and by the additional equations:

$$r_t = \sigma(W_{wr}z_t + \alpha W_{hr}h_{t-1}) \quad \text{Equation 8}$$

$$d_t = r_t \odot d_{t-1} \quad \text{Equation 9}$$

$$c_t = f_t \odot c_{t-1} + i_t \odot g_t + \tan h(W_{dc}d_r), \quad \text{Equation 10}$$

where $d_t$ is the second representation at time-step t (defined by Equation 7), $r_t$ is the reading gate at time-step t, and $\alpha$ is a scalar. In the sc-LSTM RNN, the mean hidden state (e.g., the concatenated hidden states $h_t$ of the forward and backward LSTMs) is used to initialize $h_0$ and $c_0$ in the second processing circuitry 310. The initial values may be determined by the equations:

$$h_0 = \tan h(W_{hx}x + b_{hx}) \quad \text{Equation 11}$$

$$c_0 = \tan h(W_{cx}x + b_{cx}) \quad \text{Equation 12}$$

The second representation in the sc-LSTM RNN functions similarly to a memory in that the second representation remembers which slots still need to be generated.

The one or more delexicalized sentences produced by the second processing circuitry 310 are received by the converter circuitry 315. The converter circuitry 315 converts each delexicalized sentence into a lexicalized sentence by replacing each delexicalized slot with its associated value. The value is received by the converter circuitry 315 on signal line 325. Each lexicalized sentence is then output on line 330. The lexicalized sentence(s) represents the natural language output that is ultimately provided to a user.

Figure 5:
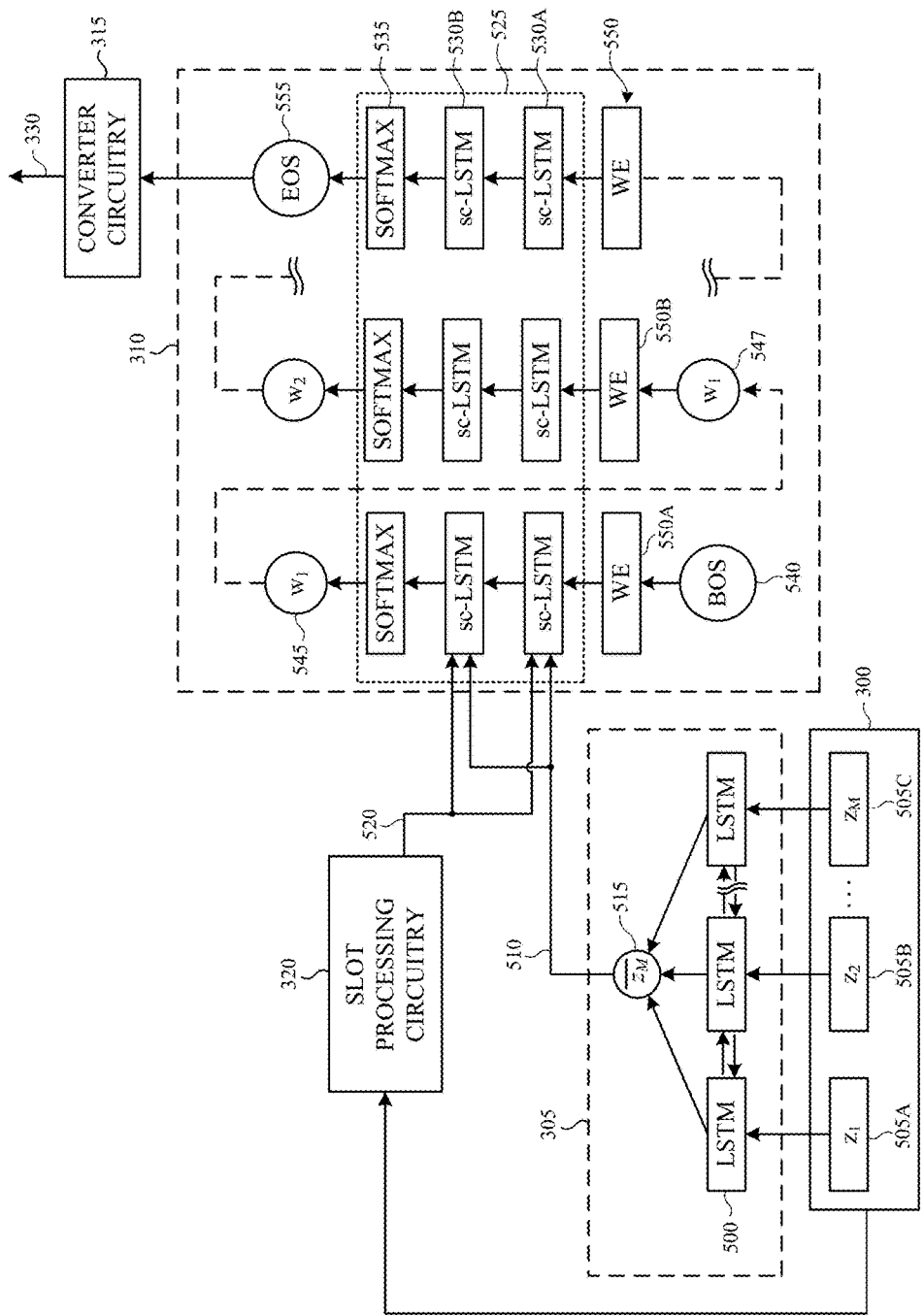
FIG. 5 is a process flow diagram depicting the operation of a natural language generator shown in FIG. 3.

FIG. 5 is a process flow diagram depicting the operation of the natural language generator shown in FIG. 3. As described earlier, the first processing circuitry 305 can include a one-layer bi-directional LSTM RNN 500. One or more dialogue act slot-value representations 505 (e.g., dialogue act slot-value representations 505A, 505B, 505C) are input into the LSTM RNN 500. The first processing circuitry 305 learns or produces a first representation of all of the dialogue act slot-value representations (e.g., the $z_t$ vectors) on line 510. In one implementation, the first representation is the mean across all of the time-steps of the concatenated hidden states $h_t$ of the forward and backward LSTMs. The mean may be generated by a computing circuit 515.

The slot processing circuitry 320 receives the dialogue act, the slot(s), and the corresponding value(s) and produces a second representation on line 520. The second representation represents all of the slots (e.g., all slot vectors $m_t$) that are expected to be present in the natural language output. In one embodiment, the second representation is the vector $d_0$ that has an initial value determined by Equation 7.

The second processing circuitry 310 receives and processes the first and the second representations to produce one or more delexicalized sentences. As described earlier, in one embodiment, the second processing circuitry 310 includes the sc-LSTM RNN 525, which can include one or more layers. In the illustrated embodiment, the sc-LSTM RNN 525 includes two sc-LSTM layers 530A, 530B and a softmax layer 535. Although represented as distinct sc-LSTM and softmax blocks, the multiple layers 530A, 530B, 535 represent one sc-LSTM RNN 525 in one embodiment.

The first and the second representations are both received by the sc-LSTM layers 530A, 530B. For the first time-step, a special symbol "BOS" 540 is used to signify the beginning of a sequence. The hidden states of the sc-LSTM layers 530A, 530B are passed to the softmax layer 535 to produce a word (e.g., delexicalized slot) at each time-step (e.g., word $w_1$ 545 at the first time-step). The word embedding (WE) 550 for the ground truth for the currently-generated word is then input into the sc-LSTM RNN 525 at the next time-step. For example, the word embedding 550A for BOS 540 is input into the sc-LSTM RNN 525 at the first time-step and the word embedding 550B for the ground truth for the word $w_1$ 547 is input at the second time-step. This process repeats and the second processing circuitry 310 continues to output a word (e.g., $w_2$, etc.) up to a predefined maximum length, or until the second processing circuitry 310 produces a special symbol "EOS" 555 (e.g., End Of Sequence).

In the sc-LSTM RNN 525, the second representation functions like a memory that remembers which slots have yet to be generated. Each time a word (e.g., a delexicalized slot) is produced, that slot is removed from the second representation. For example, if $w_1$ is a slot, the slot associated with the word $w_1$ is removed from the second representation at the first time-step. Accordingly, when the EOS 555 is generated, the value of the second representation will be zero (or a sequence of zeros when the second representation is the vector $d_0$) when all of the slots in the second representation have been output by the second processing circuitry 310.

The converter circuitry 315 receives the one or more delexicalized sentences from the second processing circuitry 310. The converter circuitry 315 produces a lexicalized sentence for each delexicalized sentence by replacing the delexicalized slot(s) in the delexicalized sentence with the value associated with each delexicalized slot. The lexicalized sentence(s) are then output on line 330. As described earlier, the lexicalized sentence(s) represents the natural language output that is ultimately provided to the user.

Figure 6:
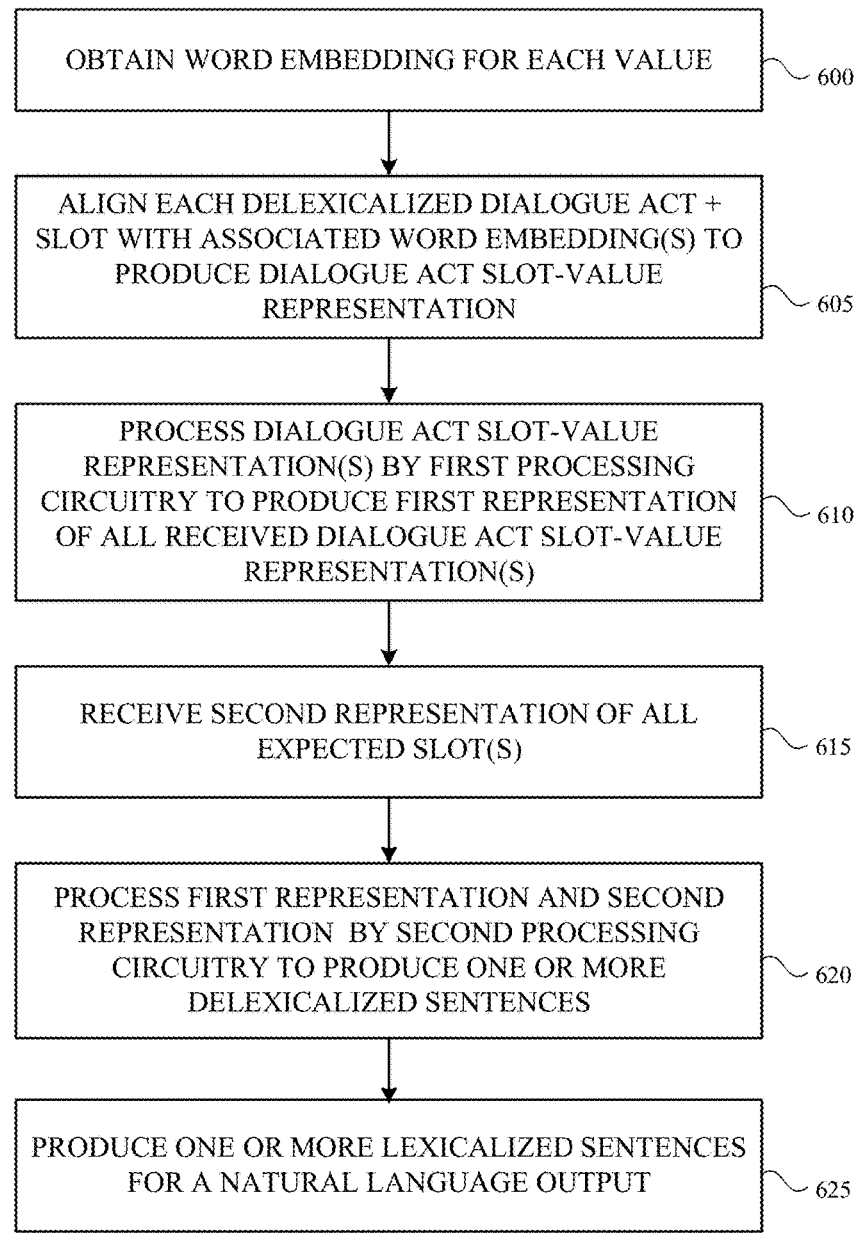
FIG. 6 is a flowchart illustrating a method of operating a natural language generator.

FIG. 6 is a flowchart illustrating a method of operating a natural language generator. Initially, one or more dialogue act slot-value pairs are generated, the process of which is depicted in blocks 600 and 605. As shown in block 600, one or more word embeddings are obtained for each value. Each delexicalized dialogue act+slot is then aligned with the associated value(s) (e.g., mean of the word embedding(s)) to produce the one or more dialogue act slot-value representations at block 605.

Next, as shown in block 610, each dialogue act slot-value representation is processed by the first processing circuitry to produce the first representation. As described earlier, the first representation represents all of the received dialogue act slot-value representations (e.g., the $z_t$ vectors). In one embodiment, the first representation is produced by determining a mean across all of the time-steps of the concatenated hidden states $h_t$ of the forward and backward LSTMs.

The second representation is then received at block 615. The second representation represents all of the slots (e.g., slot vectors $m_t$) that are expected to be present in the natural language output. As described earlier, in one embodiment, the second representation is initially a sum of all of the slot vectors $m_t$ across all of the time-steps (see Equation 7).

The first and the second representations are then processed by the second processing circuitry to produce one or more delexicalized sentences (block 620). Thereafter, at block 625, one or more lexicalized sentences are produced by replacing each delexicalized slot with its associated value. The lexicalized sentence(s) represents the natural language output that is ultimately provided to a user.

Figure 7:
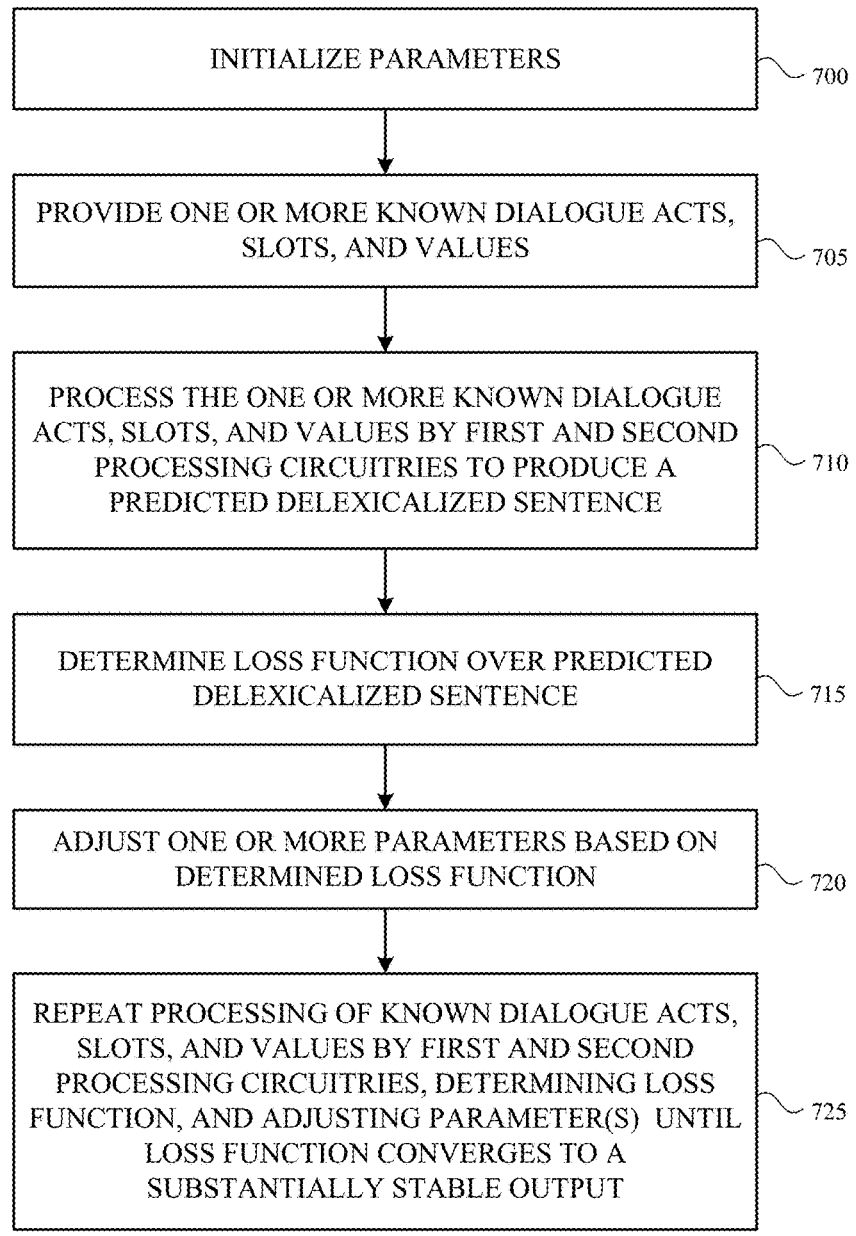
FIG. 7 is a flowchart depicting a method of training a natural language generator.

FIG. 7 is a flowchart depicting a method of training a natural language generator. Initially, the parameters in the first and the second processing circuitries are initialized at block 700. Any suitable method or technique may be used to initialize the parameters. In some embodiments, one or more parameters of the second processing circuitry (e.g., second processing circuitry 310) can be initialized using a transfer learning process. Transfer learning can improve the performance of an SDS when the SDS is operating in a domain that does not have an available large annotated dataset(s).

With transfer learning, the parameters are initialized from a pre-trained sentence auto-encoder model that is trained on sentences about a topic and/or related to a domain. The auto-encoder model is trained to learn a representation of an input sentence and then decode that representation to generate the original sentence. In one implementation, the auto-encoder model includes first processing circuitry and second processing circuitry that are similar to the first processing circuitry and the second processing circuitry described herein (e.g., first processing circuitry 305 and second processing circuitry 310). However, the first processing circuitry of the auto-encoder model receives only the word embeddings for the input sentence. Additionally, the second processing circuitry of the auto-encoder model uses LSTM units instead of sc-LSTM units. The internal LSTM-to-LSTM weights from the second processing circuitry in the auto-encoder model are used as the initial values of the corresponding weights of the internal sc-LSTM to sc-LSTM connections ($W_{hi}$, $W_{hf}$, $W_{ho}$, and $W_{hg}$) in the second processing circuitry described herein (e.g., second processing circuitry 310). The transferred weights of the internal sc-LSTM to sc-LSTM connections in the second processing circuitry 310 are then fine-tuned during training. In some implementations, the transferred weights are transferred from a different task (e.g., output original input sentence) and not from the same task (e.g., output natural language output of SDS for input dialogue acts) on a different domain.

After the parameters are initialized, one or more known dialogue acts, slots, and values are provided, input into, and processed by, the first and the second processing circuitries to produce a predicted delexicalized sentence (blocks 705 and 710). Thereafter, a loss function over the predicted sentence is determined at block 715. In one embodiment, the loss value is determined by the function:

$$L=\Sigma_{t=1}^{T} y_t^T \log(p_t)+\|d_T\|+\Sigma_{t=1}^{T}\eta \xi^{\|d_t-d_{t-1}\|}, \qquad \text{Equation 13}$$

where $y_t$ is the ground truth word distribution, $p_t$ is the predicted word distribution, T is the number of time-steps in the first processing circuitry, and $\eta$ and $\xi$ are scalars set to given values. In one embodiment, the given values for the scalars $\eta$ and $\xi$ are 0.0001 and 100, respectively. The term $\|d_T\|$ pushes the NLG to generate all the slots that should be generated so that at the last time-step there are no slots remaining. Because the output of the second processing circuitry is one delexicalized slot or a word at each time-step, the last term $\Sigma_{t=1}^{T}\eta \xi^{\|d_t-d_{t-1}\|}$ encourages the second processing circuitry to not drop more than one slot in the second representation at once (e.g., vector $d_0$).

Next, as shown in block 720, one or more parameters of the NLG are adjusted based on the determined loss function. In one embodiment, the Adaptive Moment Estimation (Adam) optimizer algorithm is used to determine each revised parameter. The operations of blocks 710, 715, and 720 repeat until the loss function converges on a substantially stable output (block 725). The neural networks in the first and the second processing circuitries are considered trained when the loss function converges on a substantially stable output.

As should be appreciated, FIGS. 5-7 are described for purposes of illustrating the present methods and systems and is not intended to limit the disclosure to a particular sequence of steps or a particular combination of hardware or software components. For example, neural networks other than an LSTM RNN and/or an sc-LSTM RNN may be used in some embodiments. Additionally or alternatively, an LSTM RNN and/or an sc-LSTM RNN can each include one or more layers.

Figure 8:
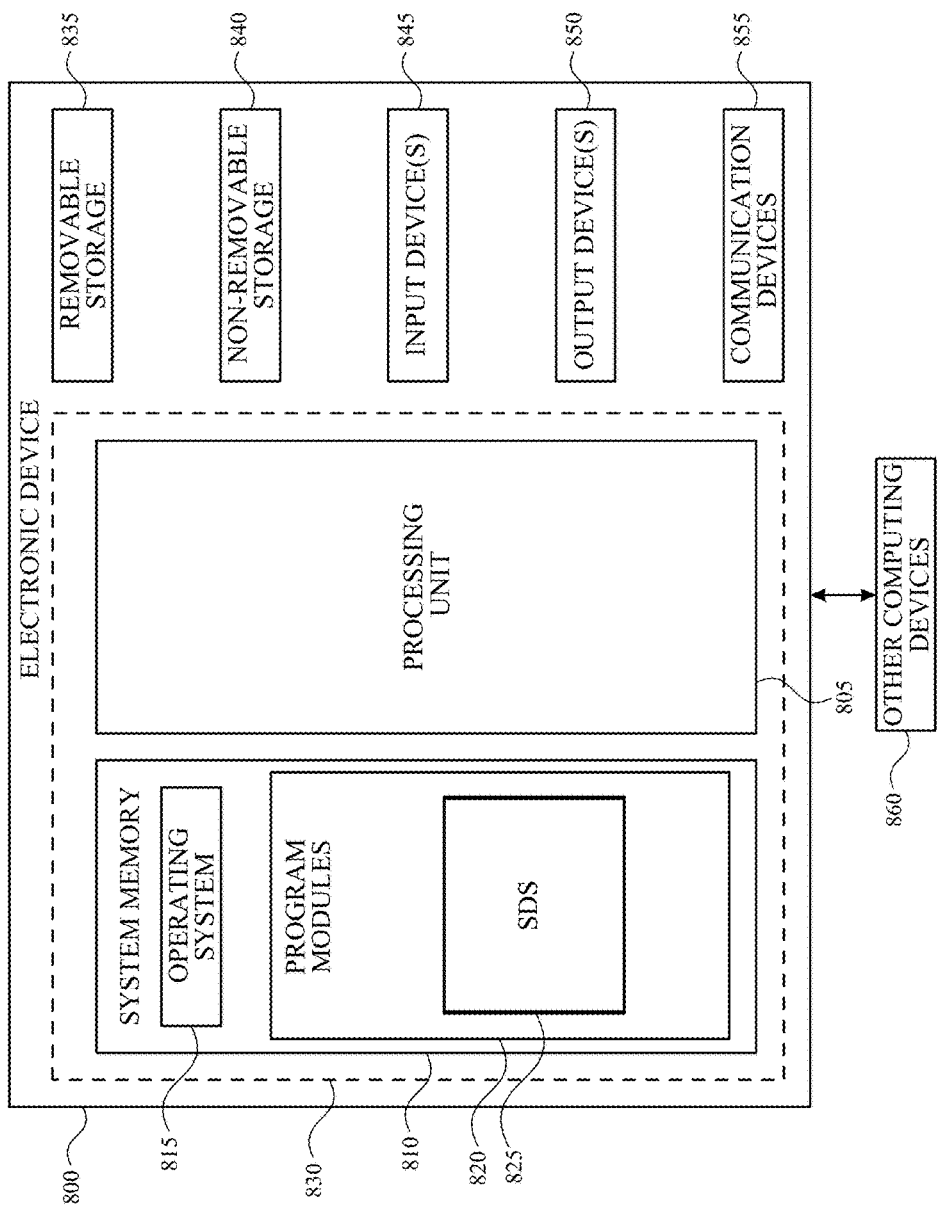
FIG. 8 is a block diagram illustrating example physical components of a computing device with which aspects of the disclosure may be practiced.

FIG. 8 is a block diagram illustrating physical components (e.g., hardware) of an electronic device 800 with which aspects of the disclosure may be practiced. The components described below may be suitable for the computing devices described above, including the client-computing device 110 and/or the server-computing device 125 in FIG. 1.

In a basic configuration, the electronic device 800 may include at least one processing unit 805 and a system memory 810. Depending on the configuration and type of the electronic device, the system memory 810 may comprise, but is not limited to, volatile storage (e.g., random access memory), non-volatile storage (e.g., read-only memory), flash memory, or any combination of such memories. The system memory 810 may include a number of program modules and data files, such as an operating system 815, one or more program modules 820 suitable for parsing received input, determining subject matter of received input, determining actions associated with the input and so on, and a SDS program module 825. While executing on the processing unit 805, the SDS program module 825 may perform and/or cause to be performed processes including, but not limited to, the aspects as described herein.

The operating system 815, for example, may be suitable for controlling the operation of the electronic device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 830.

The electronic device 800 may have additional features or functionality. For example, the electronic device 800 may also include additional data storage devices (removable and/or non-removable) such as, for example, magnetic disks, optical disks, or tape. Such additional storage is illustrated in FIG. 8 by a removable storage device 835 and a non-removable storage device 840.

The electronic device 800 may also have one or more input device(s) 845 such as a keyboard, a trackpad, a mouse, a pen, a sound or voice input device, a touch, force and/or swipe input device, etc. The output device(s) 850 such as a display, speakers, a printer, etc. may also be included. The aforementioned devices are examples and others may be used. The electronic device 800 may include one or more communication devices 855 allowing communications with other electronic devices 860. Examples of suitable communication devices 855 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 810, the removable storage device 835, and the non-removable storage device 840 are all computer storage media examples (e.g., memory storage or storage device). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 800. Any such computer storage media may be part of the electronic device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Figure 9:
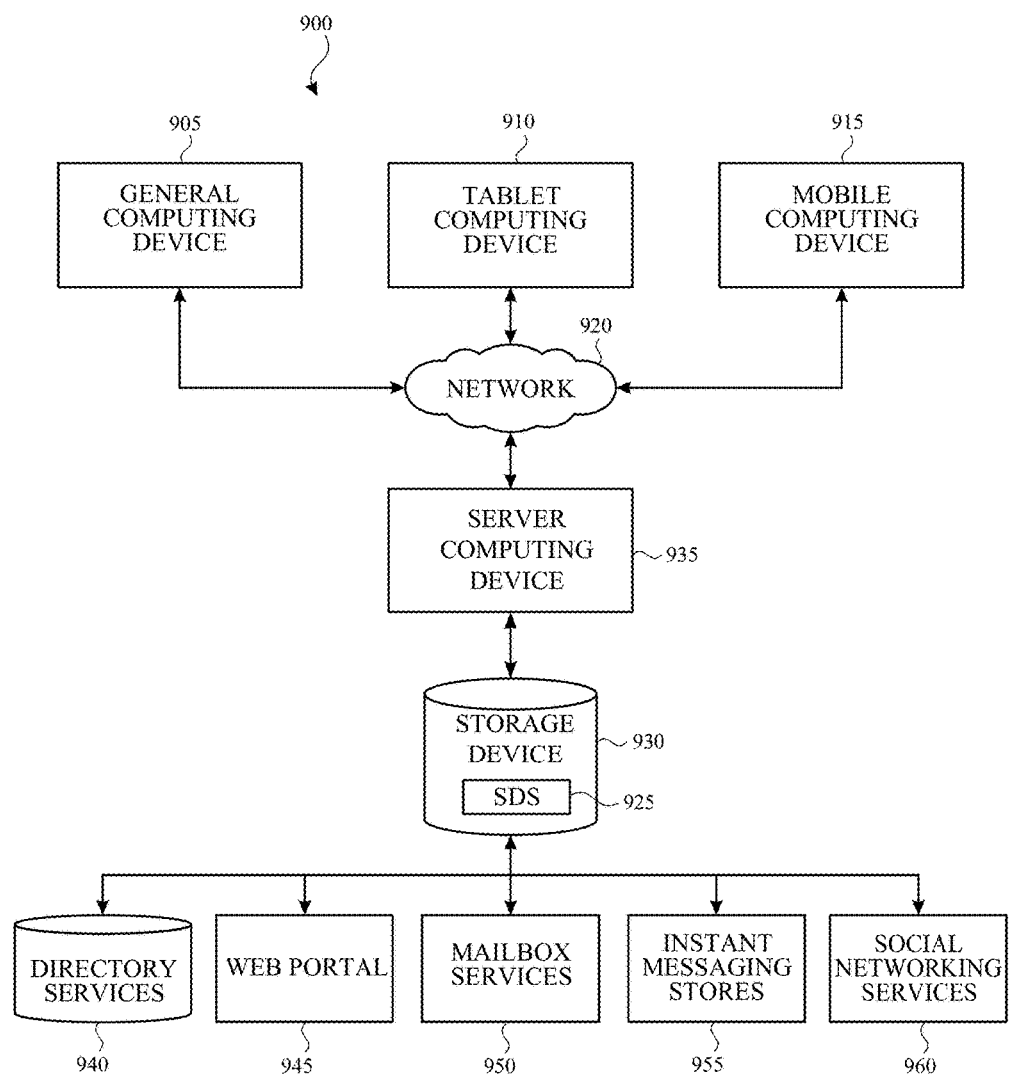
FIG. 9 is a block diagram of a distributed computing system in which aspects of the present disclosure may be practiced.

FIG. 9 is a block diagram illustrating a distributed system in which aspects of the disclosure may be practiced. The system 900 allows a user to submit a language input (e.g., verbally and/or written) through a general computing device 905 (e.g., a desktop computer), a tablet computing device 910, and/or a mobile computing device 915. The general computing device 905, the tablet computing device 910, and the mobile computing device 915 can each include the components, or be connected to the components, that are shown associated with the client-computing device 110 in FIG. 1.

The general computing device 905, the tablet computing device 910, and the mobile computing device 915 are each configured to access one or more networks (represented by network 920) to interact with the SDS 925 stored in one or more storage devices (represented by storage device 930) and executed on one or more server-computing devices (represented by server-computing device 935).

In some aspects, the server-computing device 935 can access and/or receive various types of documents and information transmitted from other sources, such as a directory service 940, a web portal 945, mailbox services 950, instant messaging services 955, and/or social networking services 960. In some instances, these sources may provide robust reporting, analytics, data compilation and/or storage service, etc., whereas other services may provide search engines or other access to data and information, images, videos, document processing and the like.

As should be appreciated, FIG. 9 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A spoken dialogue system, comprising:
    first processing circuitry;
    second processing circuitry operably connected to the first processing circuitry; and one or more storage devices storing computer executable instructions that when executed by the first and the second processing circuitries, performs a method, comprising:
    processing, by the first processing circuitry, one or more dialogue act slot-value representations to produce a first representation of the one or more dialogue act slot-value representations, wherein each dialogue act slot-value representation comprises a first vector representing a delexicalized dialogue act and slot and a second vector representing a lexicalized value associated with the delexicalized slot; and
    processing, by the second processing circuitry, the first representation and a second representation to produce one or more delexicalized sentences as an output, the second representation representing one or more delexicalized slots expected to be included in the natural language output.

2. The spoken dialogue system of claim 1, wherein the first processing circuitry comprises a neural network operably connected to a computing circuit.

3. The spoken dialogue system of claim 2, wherein the neural network comprises a bi-directional long short-term memory (LSTM) recurrent neural network.

4. The spoken dialogue system of claim 3, wherein the method further comprises computing, by the computing circuit, a mean across all time-steps of concatenated hidden states $h_t$ of a forward LSTM and a backward LSTM.

5. The spoken dialogue system of claim 1, wherein the second processing circuitry comprises a recurrent neural network.

6. The spoken dialogue system of claim 5, wherein the second processing circuitry comprises a semantically controlled long short-term memory recurrent neural network.

7. The spoken dialogue system of claim 6, wherein one or more parameters associated with the semantically controlled long short-term memory recurrent neural network are initialized based on transfer learning.

8. The spoken dialogue system of claim 1,
    further comprising alignment circuitry operably connected to an input of the first processing circuitry, wherein the one or more storage devices stores computer executable instructions that when executed by the alignment circuitry, causes the alignment circuitry to produce each dialogue act slot-value representation by aligning the first vector representing the delexicalized dialogue act and slot with the second vector representing the lexicalized value associated with the delexicalized slot.

9. The spoken dialogue system of claim 1, wherein the first vector representing the delexicalized dialogue act and slot comprises a one-hot vector of the delexicalized dialogue act and slot and the second vector representing the lexicalized value comprises a mathematical representation of one or more word embeddings, each word embedding corresponding to a word in the lexicalized value.

10. The spoken dialogue system of claim 1, further comprising converter circuitry operably connected to an output of the second processing circuitry, wherein the one or more storage devices stores computer executable instructions that when executed by the converter circuitry, causes the converter circuitry to produce a lexicalized sentence for each delexicalized sentence by replacing each delexicalized slot in a respective delexicalized sentence with an associated value.

11. The spoken dialogue system of claim 1, further comprising slot processing circuitry operably connected to the second processing circuitry, wherein the one or more storage devices stores computer executable instructions that when executed by the slot processing circuitry, causes the slot processing circuitry to produce the second representation that represents the one or more delexicalized slots expected to be included in the natural language output.

12. The spoken dialogue system of claim 11, wherein each delexicalized slot expected to be included in the natural language output comprises a one-hot vector and the second representation comprises a sum of the one-hot vectors associated with the one or more delexicalized slots expected to be included in the natural language output.

13. A method of operating a spoken dialogue system, comprising:
    receiving one or more dialogue act slot-value representations, each dialogue act slot-value representation comprising a first vector representing a delexicalized dialogue act and slot and a second vector representing a lexicalized value associated with the delexicalized slot;
    processing the one or more dialogue act slot-value representations to produce a first representation of the one or more dialogue act slot-value representations; and
    processing the first representation and a second representation to produce one or more delexicalized sentences as an output, the second representation representing one or more delexicalized slots expected to be included in the natural language output.

14. The method of claim 13, wherein each delexicalized slot expected to be included in the natural language output comprises a one-hot vector and the method further comprises producing the second representation by producing a sum of each one-hot vector associated with the one or more delexicalized slots expected to be included in the natural language output.

15. The method of claim 13, further comprising producing a lexicalized sentence for each delexicalized sentence by replacing each delexicalized slot in a respective delexicalized sentence with an associated value.

16. The method of claim 13, further comprising:
receiving a word embedding for each word in a value associated with a respective delexicalized slot; and
producing the second vector representing the lexicalized value for a respective dialogue act slot-value pair by computing a mathematical representation of the word embeddings.

17. The method of claim 13, wherein processing the first representation and the second representation to produce the one or more delexicalized sentences as the output comprises processing, by a semantically controlled long short-term memory recurrent neural network, the first representation and the second representation to produce the one or more delexicalized sentences as the output.

18. The method of claim 17, further comprising initializing one or more parameters of the semantically controlled long short-term memory recurrent neural network through a transfer learning process.

19. A method of operating a spoken dialogue system, comprising:
receiving one or more dialogue act slot-value representations, each dialogue act slot-value representation comprising a concatenation of a first vector and a second vector, the first vector representing a delexicalized dialogue act and slot and the second vector representing a lexicalized value associated with the delexicalized slot, wherein the second vector comprises a mathematical representation of one or more word embeddings, each word embedding corresponding to a word in the lexicalized value;
processing the one or more dialogue act slot-value representations to produce a first representation of the one or more dialogue act slot-value representations;
processing the first representation and a second representation to produce one or more delexicalized sentences as an output, the second representation representing one or more delexicalized slots expected to be included in the natural language output; and
producing a lexicalized sentence for each delexicalized sentence by replacing each delexicalized slot in a respective delexicalized sentence with an associated value.

20. The method of claim 19, wherein the first vector comprises a one-hot vector of the delexicalized dialogue act and slot and the mathematical representation comprises a mean of the one or more word embeddings.

* * * * *